Dec. 12, 1967  A. H. KIDDER ET AL  3,357,694
WAVE DAMPER FOR OVERHEAD TRANSMISSION CONDUCTORS
Filed Sept. 16, 1965  6 Sheets-Sheet 1

INVENTORS.
ALLAN H. KIDDER
RICHARD A. MULFORD
FRANK KAHN
BY
ATTORNEY

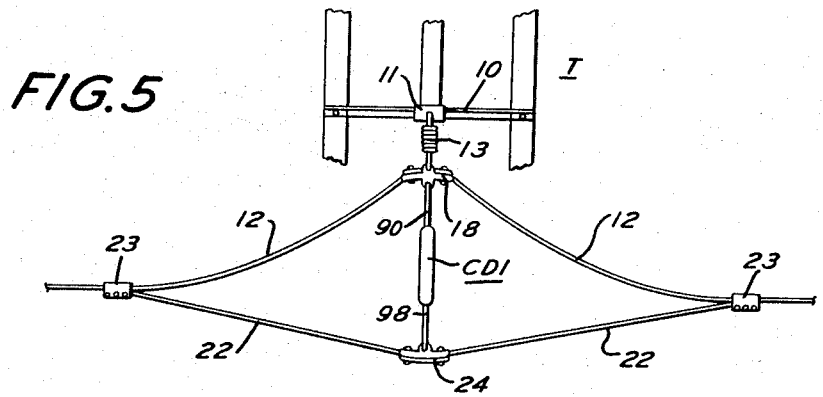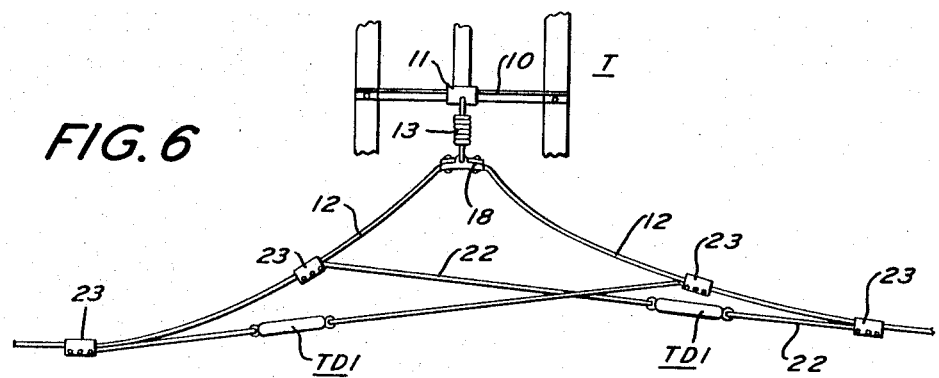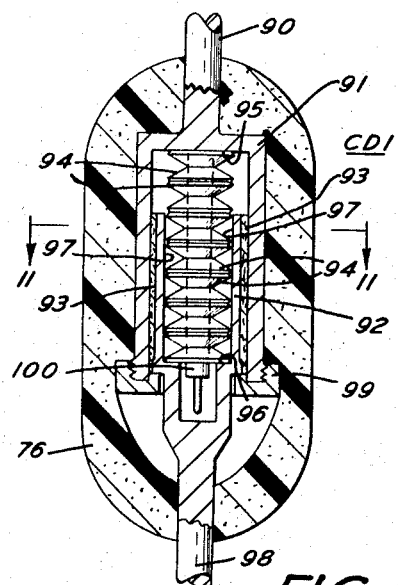

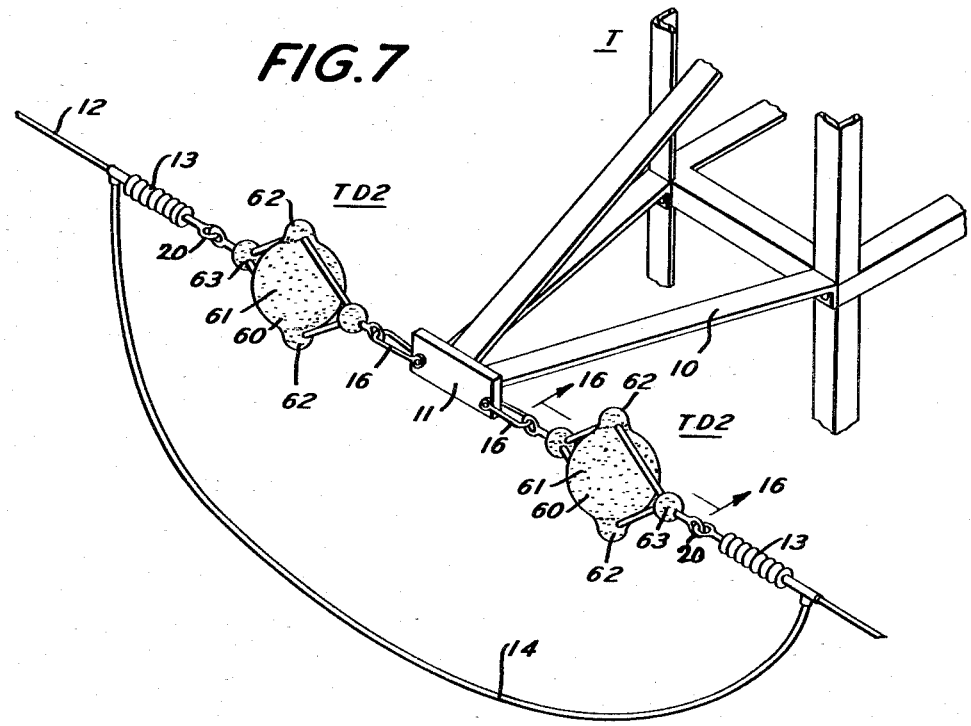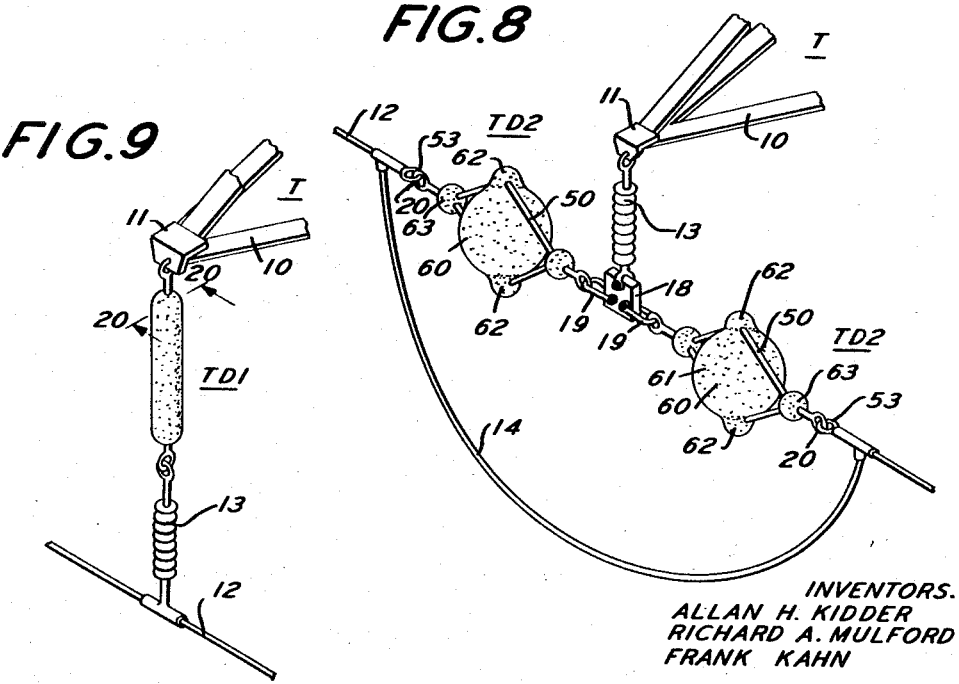

Dec. 12, 1967  A. H. KIDDER ET AL  3,357,694
WAVE DAMPER FOR OVERHEAD TRANSMISSION CONDUCTORS
Filed Sept. 16, 1965  6 Sheets-Sheet 4
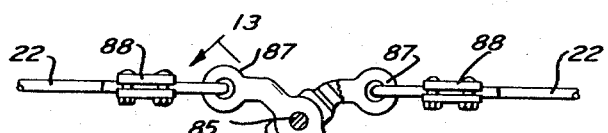
FIG.12
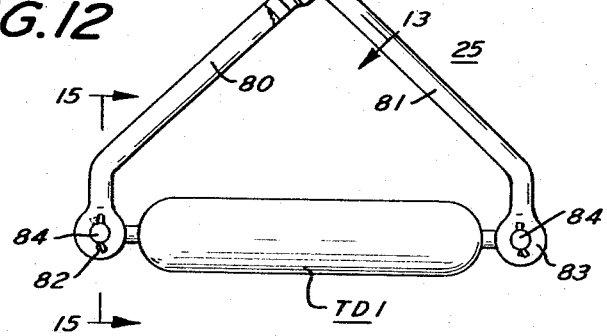

INVENTOR.
ALLAN H. KIDDER
RICHARD A. MULFORD
FRANK KAHN
BY
ATTORNEY

Dec. 12, 1967     A. H. KIDDER ET AL     3,357,694
WAVE DAMPER FOR OVERHEAD TRANSMISSION CONDUCTORS
Filed Sept. 16, 1965     6 Sheets-Sheet 5
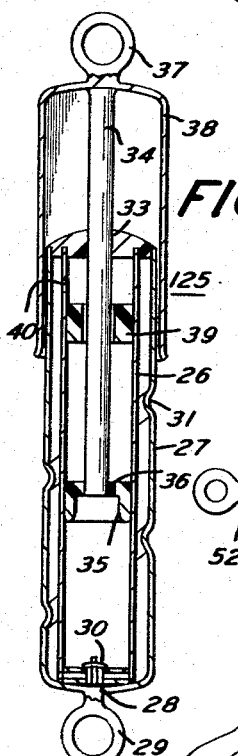
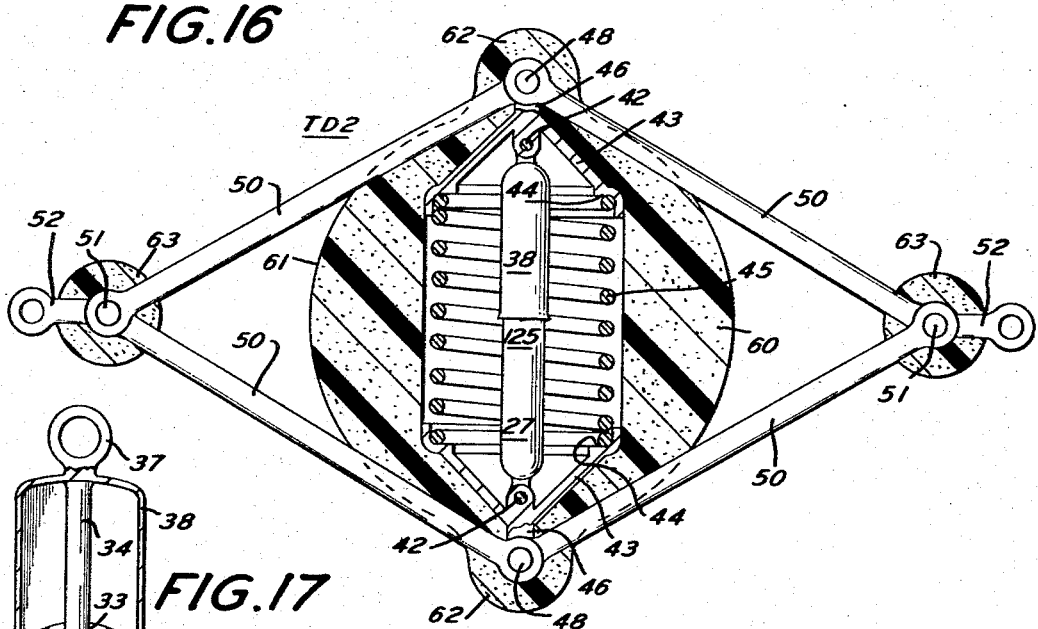
INVENTORS.
ALLAN H. KIDDER
RICHARD A. MULFORD
FRANK KAHN
BY *B. T. Wobensmith*
ATTORNEY Dec. 12, 1967     A. H. KIDDER ET AL     3,357,694
WAVE DAMPER FOR OVERHEAD TRANSMISSION CONDUCTORS
Filed Sept. 16, 1965     6 Sheets-Sheet 6
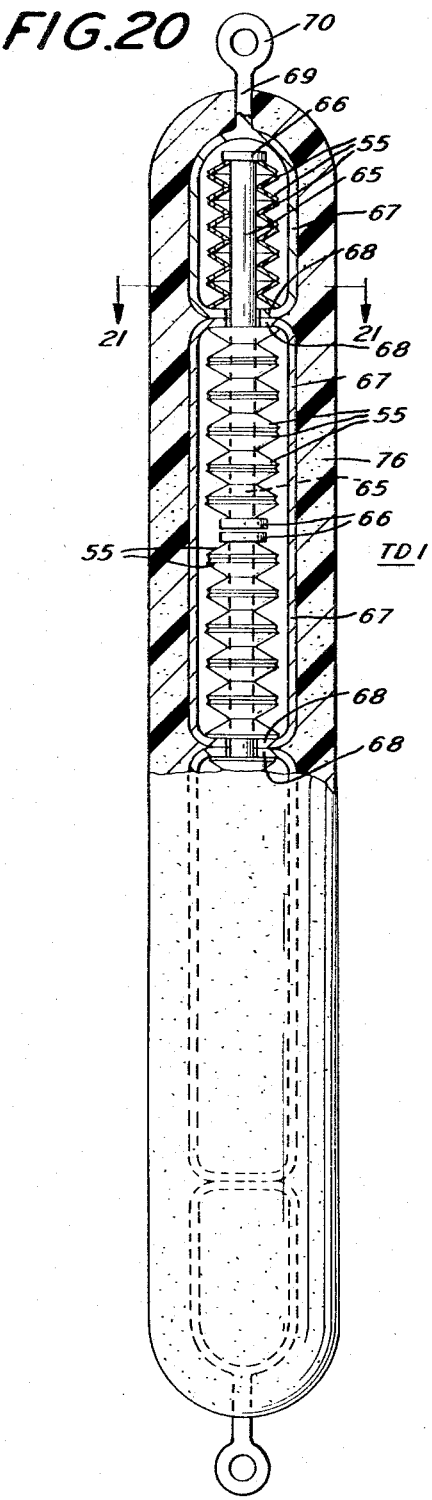
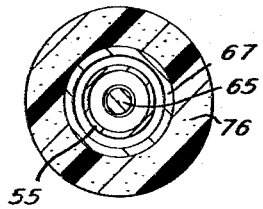
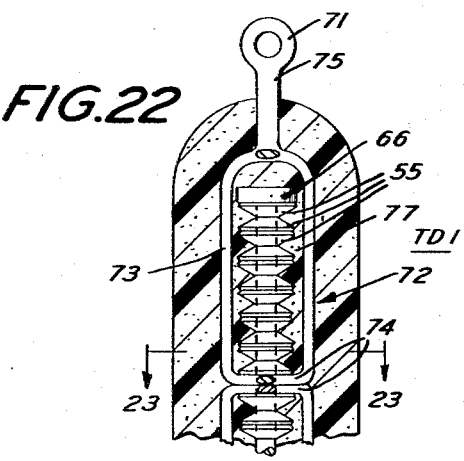
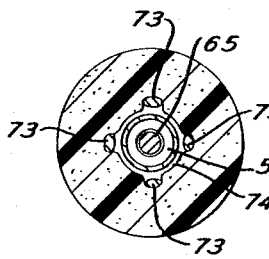
INVENTORS.
ALLAN H. KIDDER
RICHARD A. MULFORD
FRANK KAHN
BY
ATTORNEY United States Patent Office 3,357,694
Patented Dec. 12, 1967

3,357,694
WAVE DAMPER FOR OVERHEAD
TRANSMISSION CONDUCTORS
Allan H. Kidder, 118 Owen Ave., Lansdowne, Pa. 19050;
Richard A. Mulford, 1231 Wisteria Drive, Malvern, Pa.
19355; and Frank Kahn, 1865 Edmund Road, Abington, Pa. 19001
Filed Sept. 16, 1965, Ser. No. 487,830
11 Claims. (Cl. 267—70)

ABSTRACT OF THE DISCLOSURE

This invention comprises an elongated resilient extensible tension element to be used in tensile association with an overhead transmission conductor for damping galloping oscillations therein. The element includes energy absorbing and dissipating components which remove increments of energy by hysteresis effect during each cycle of oscillation. One of the components is an array of Belleville spring washers disposed on a central rod and arranged to be stressed in compression with increase of tensile force applied to the element. This spring washer component develops the major tensile reaction to the applied forces. An auxiliary elastomeric component surrounds the spring washer component and is arranged to be stressed simultaneously therewith. The elastomeric component absorbs and dissipates energy by internal hysteresis and in addition provides a corrosion protective and corona shielding encapsulation for the element.

---

This invention relates to wave dampers for overhead electric power transmission lines and more particularly to dampers for suppressing the low frequency high amplitude waves which occur in overhead transmission lines, the condition which is known as "galloping" of the conductors.

These waves appear to be caused under certain conditions by the sustained application of normally small aerodynamic forces on the overhead lines and can result in damage to the lines and to the supporting structures for the lines. This galloping in many instances has occurred when glaze or snow was present on the conductors. It has a frequency of the order of several seconds per cycle with an amplitude which may be as much as 12 feet. This phenomenon is different from aeolian waves which may have a frequency of the order of 20 to 50 cycles per second and amplitude of the order of one and one half inch. The aeolian waves may cause fatigue effects noticeable only after many years but do not have the immediately destructive effect of the galloping of the transmission lines.

Various structures have heretofore been proposed for suppressing or mitigating these galloping waves but none of these has proven satisfactory. Some of the prior structures did not appear to take into account the glaze or snow covered condition which may be present. Others of the prior structures did not provide adequate suppression, nor adequate energy absorption and dissipation in use.

It is the principal object of the present invention to provide a wave damper for transmission lines which is simple but effective in its action, will have a long useful life, and which will not interfere with or adversely affect the electrical characteristics of the transmission line.

It is a further object of the present invention to provide a wave damper for transmission lines which is particularly resistant to adverse effects of ice deposits or coatings thereon.

It is a further object of the present invention to provide a wave damper for transmission lines which may be employed either in an energized or in a non-energized relation to the transmission lines.

It is a further object of the present invention to provide a wave damper for transmission lines which can be prestressed and which will not be injuriously affected by the release of the prestressing forces.

It is a further object of the present invention to provide a wave damper for transmission lines which prevents excessive amplitude build-up of conductor oscillation by dissipating energy through hysteresis effect during each cycle of oscillation.

It is a further object of the present invention to provide a wave damper for transmission lines in which the operating portions are encapsulated with a material which prevents corrosion.

It is a further object of the present invention to provide a wave damper which is encapsulated and by reason of the external shape has greatly reduced tendency to corona formation.

It is a further object of the present invention to provide a wave damper for transmission lines in which the components are of such type and construction as to have a long useful life.

Other objects and advantageous features of the invention will be apparent from the description and claims.

The nature and characteristic features of the invention will be more readily understood from the following description, taken in connection with the accompanying drawings forming part thereof, in which;

FIG. 5 is a view similar to FIG. 1 showing a wave damper in compression;

FIG. 6 is a view similar to FIG. 1 showing multiple wave damper arrangements in tension;

FIG. 7 is a view in perspective of a portion of a transmission line having two wave dampers in accordance with one form of the invention included therein in tension the wave dampers being insulated from the conductor;

FIG. 8 is a view in perspective of a portion of another transmission line in accordance with the invention having two wave dampers included therein in tension, and with an insulator interposed between the connected dampers and the support;

FIG. 9 is a view in perspective of a portion of another transmission line provided with a wave damper in accordance with the invention having another form of wave damper included therein in tension, the wave damper being insulated from the conductor;

FIG. 10 is a vertical central sectional view of a compression type wave damper;

FIG. 11 is a transverse sectional view taken approximately on the line 11—11 of FIG. 10;

FIG. 12 is an enlarged view in elevation of the wave damper shown in FIG. 3;

FIG. 16 is a vertical sectional view, taken approximately on the line 16—16 of FIG. 7 showing the detail of construction of one form of damper;

FIG. 17 is a fragmentary vertical sectional view, enlarged, of an internal centrally disposed fluid filled damper employed with the structure of FIG. 16;

FIG. 18 is a view similar to FIG. 16 showing a different form of central damper;

FIG. 19 is a horizontal sectional view taken approximately on the line 19—19 of FIG. 18 and showing the pivotal connection of the links;

FIG. 20 is a vertical sectional view, enlarged, of a tension type damper;

FIG. 21 is a horizontal sectional view, taken approximately on the line 21—21 of FIG. 20;

FIG. 22 is a fragmentary longitudinal sectional view showing a modified form of the damper shown in FIG. 20;

FIG. 23 is a transverse sectional view taken approximately on the line 23—23 of FIG. 22;

It should, of course, be understood that the description and drawings herein are illustrative merely, and that various modifications and changes can be made in the structure disclosed without departing from the spirit of the invention.

Like numerals refer to like parts throughout the several views.

Figure 1:
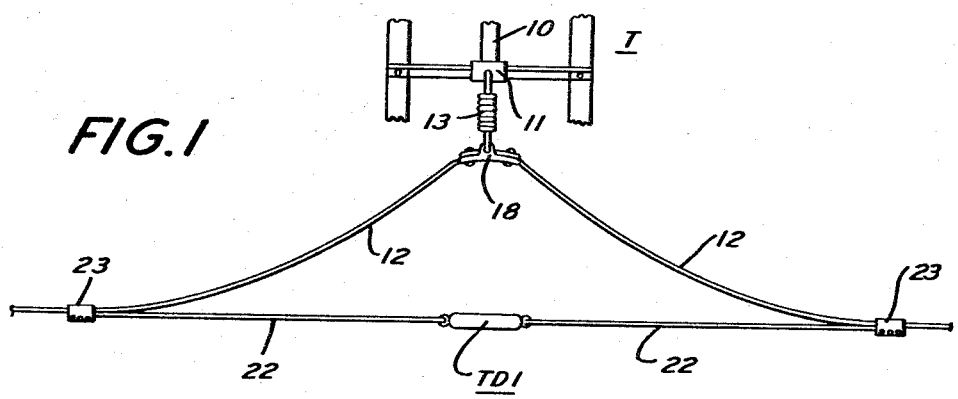
FIGURE 1 is an elevational view showing the end of a tower with a portion of a transmission line carried thereon and having a wave damper in accordance with the invention connected in parallel with the line.

Referring now more particularly to FIG. 1 of the drawings, a cross arm 10 of a tower T is shown having an end mounting plate 11. A conductor 12 subject to "galloping" is connected to a connector plate 18, an insulator 13 being interposed between the plate 18 and the mounting plate 11. A tension type damper TD1 (see FIGS. 20 to 25, inclusive) is connected at its ends by cables 22 and clamps 23 to the conductor 12.

Figure 2:
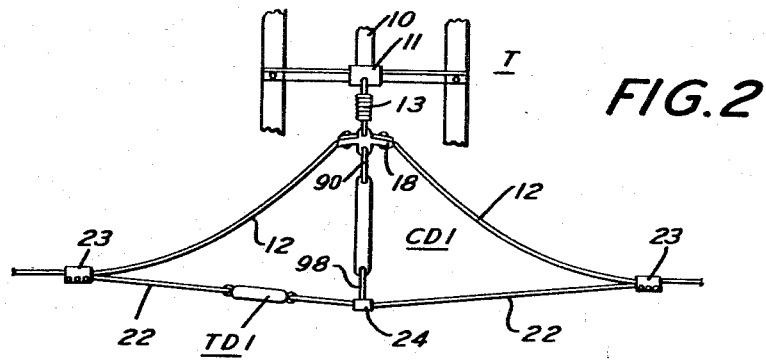
FIG. 2 is a view similar to FIG. 1 showing a wave damper in tension and a wave damper in compression.

In FIG. 2 of the drawings, a cross arm 10 of a tower T is shown having an end mounting plate 11 carrying an insulator 13 which supports a connector plate 18 to which the conductor 12 is connected. A tension type damper TD1 (see FIGS. 20 to 25, inclusive) is connected at its ends by cables 22 and clamps 23 to the conductor 12, the damper TD1 being closer to one clamp 23 than to the other. A saddle clamp 24 mounted at one of the cables 22 between the damper TD1 and the remote clamp 23 has one end of a compression type damper CD1 (see FIGS. 10 and 11) connected thereto, the other end of the damper CD1 being mounted on the plate 18.

Figure 3:
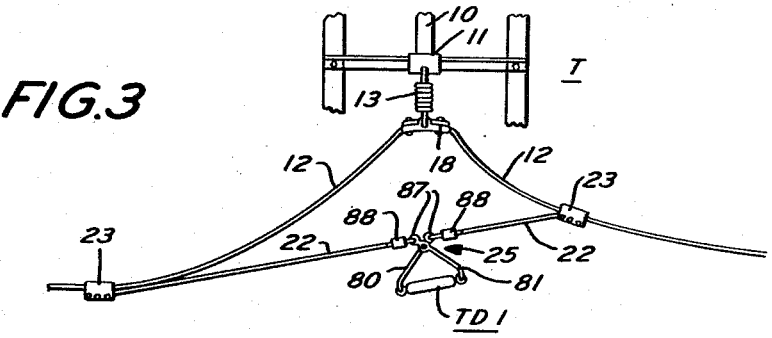
FIG. 3 is a view similar to FIG. 1 showing a different form of wave damper in tension.

In FIG. 3, a cross arm 10 of a tower T is shown having an end mounting plate 11, carrying an insulator 13 which supports a connector plate 18 to which the conductor 12 is connected. A tension type damper TD1 is provided with a connecting linkage 25, shown in detail in FIGS. 12 to 15, connected by cables 22 and clamps 23 unsymmetrically to the conductor 12. The purpose of this unsymmetrical connection is to prevent occurrence of a synchronous mode of vibration in which the points of attachment of the clamps 23 to the conductor 12 in the respective adjacent spans could remain at substantially constant spacing and render the damper ineffective.

Figure 4:
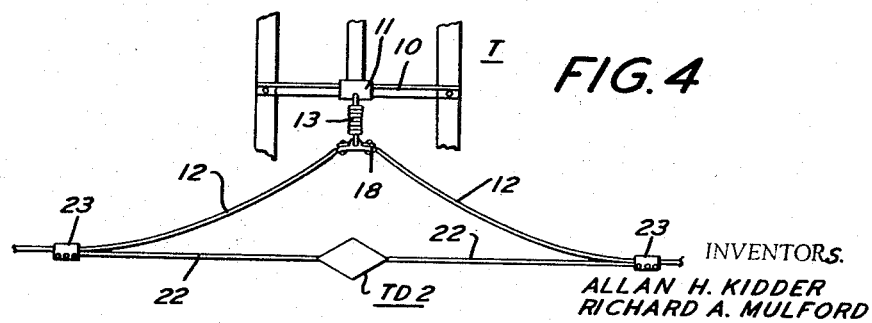
FIG. 4 is a view similar to FIG. 1 showing a still different form of wave damper in tension.
Figure 13:
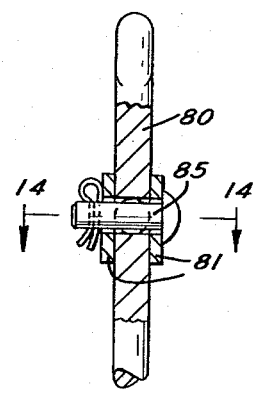
FIG. 13 is a sectional view, enlarged, taken approximately on the line 13—13 of FIG. 12.
Figure 15:
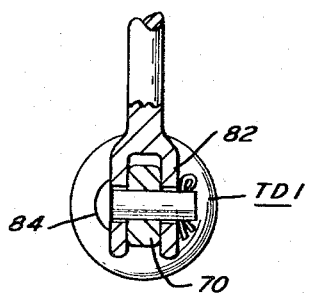
FIG. 15 is a sectional view, enlarged, taken approximately on the line 15—15 of FIG. 12.
Figure 14:
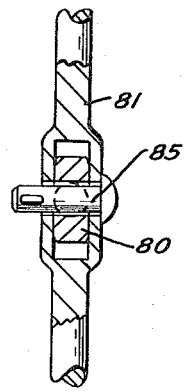
FIG. 14 is a transverse sectional view, enlarged, taken approximately on the line 14—14 of FIG. 13.

In FIG. 4 a cross arm 10 of a tower T is shown having an end mounting plate 11, carrying an insulator 13 which supports a connector plate 18 to which the conductor 12 is connected. A tensile linkage unit TD2 including an internal compression type damper (see FIGS. 16 to 19, inclusive) is connected to the conductor 12 by cables 22 and clamps 23.

In FIG. 5 a cross arm 10 of a tower T is shown having an end mounting plate 11, carrying an insulator 13, which supports a connector plate 18 and which is similar to FIG. 2 but does not include a tension type damper. A compression type damper CD1 (see FIGS. 10 and 11) is connected at one end to the plate 18, and connected at the other end to a saddle clamp 24 from which cables 22 extend to clamps 23 on the conductor 12.

In FIG. 6 a cross arm 10 of a tower T has an end mounting plate 11 carrying an insulator 13 which supports a connector plate 18 to which the conductor 12 is connected.

A plurality of tension type dampers TD1 are unsymmetrically connected by cables 22 and clamps 23 to the conductor 12.

In FIG. 7 of the drawings, a cross arm 10 of a transmission line tower T is shown having an end mounting plate 11. A conductor 12 subject to "galloping" is connected to insulator 13 with a slack conductor 14 connected therebetween. Interposed between the insulators 13 and the mounting plate 11 and pivotally connected to the plate 11 by links 16 tensile linkage units TD2 including internal compression type damping devices are provided.

In FIG. 8 of the drawings, the tower cross arm 10 has pivotally connected to a mounting plate 11 an insulator 13 to which a connector plate 18 is pivotally connected. The connector plate 18 has links 19 connected on opposite sides thereof to tensile linkage units TD2 to which the conductor 12 is pivotally connected at 20, with a slack conductor connection 14. In the structure of FIG. 8, one of the two tensile linkage units TD2 may suitably be omitted in which case the conductor 12 on that side may be connected directly to the connector plate 18.

In FIG. 9 of the drawings, the tower cross arm 10, as in FIG. 8 has pivotally connected thereto to a mounting plate 11, a tension type damping device TD1 to which an insulator 13 is connected. The insulator 13 directly carries the conductor 12.

The details of the tensile linkage units TD2 with their internal compression damping devices as employed in FIGS. 7 and 8 are shown in FIGS. 16 to 19, inclusive.

Figure 24:
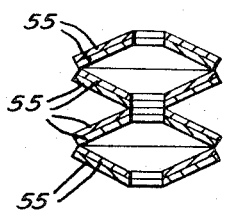
FIG. 24 is a fragmentary sectional view showing a different arrangement of spring washers.
Figure 25:
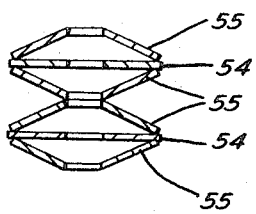
FIG. 25 is a fragmentary sectional view showing a still different arrangement of spring washers.

In FIGS. 10 and 11, the details of a compression type damper CD1, are shown which includes a force applying rod 90, connected to a cylinder 91. Within the cylinder 91 a split sleeve 92 is provided having friction shoes 93 bonded to the exterior thereof. The sleeve 92 is normally spread apart so as to require compression for insertion into the interior of the cylinder 91. The cylinder 91 has an interior rod 100 on which a plurality of Belleville spring washers 94 are mounted to engage the interior end wall 95 of the cylinder 91 and a shoulder 96 in the sleeve 92. Other arrangements of Belleville spring washers, such as are shown in FIGS. 24 and 25 could be utilized, if desired.

The sleeve 92 has a force applying rod 98 extending therefrom. A retaining nut 99 threaded on the cylinder 91 prevents separation of the sleeve 92 longitudinally of the cylinder 91. An elastomer envelope 76 bonded to the cylinder 91 and the contiguous part of the rod 90 and the rod 98 is preferably provided for weather protection and for its own energy absorbing and dissipating actions upon compression.

In FIGS. 12 to 15, the linkage 25 for the tension type damper TD1 has cross levers 80 and 81 with forked ends 82 and 83 connected to the eyes 70 of the damper TD1 by pivot pins 84.

The levers 80 and 81 are connected by a pivot pin 85, at locations intermediate their ends to modify the input movement transmitted to the damper TD1, and have end eyes 87 with pivotal connections through clamps 88 to the cables 22.

In FIGS. 16 and 17 a tensile linkage unit TD2 is illustrated which includes a fluid filled damper 125 of the dashpot type having the characteristics of retarding movement in either longitudinal direction and of dissipating a portion of the energy applied thereto. The damper 125 includes inner and outer cylindrical casings 26 and 27, having a mechanical connection at one end in the form of a connector 28 and external ring 29. The connector 28 preferably has a non-return or check valve 30 therein which permits flow from the outer casing 27 into the inner casing 26 but closes to prevent flow in the other direction. The outer casing 27 preferably has a helical groove 31 providing a baffling to delay the fluid flow in either direction in the space between the inner casing 26 and the outer casing 27.

The casings 26 and 27 are closed at their other ends by a closure and end seal 33 through which a piston rod 34 extends. The piston rod 34, within the inner casing 26 has a piston 35 thereon engaging the walls of the inner casing 26. The piston 35 has a small orifice or restriction 36 to permit limited flow between opposite sides of the piston 35 upon the application of forces thereon. The piston rod 34 at its outer end has a connecting ring 37 and can carry shield 38.

Within the inner casing 26 a fixed rod guide 39 is provided through which the piston rod extends with adequate clearance to permit fluid flow in either direction.

The inner casing 26 preferably has an orifice 40 therethrough establishing communication between the interior of the casing 26 and the space between the inner and outer casings 26 and 27.

The rings 29 and 37 are pivotally connected by pins 42 to heads 43 which have internal annular seats 44 for the ends of a helical compression spring 45. The heads 43 have end projections 46 with openings 47 for engagement by pins 48. Link bars 50 in pairs have ends carried on the pins 48 and are connected at their opposite ends by pivot pins 51. From the pins 51 connecting links 52 extend for connection as shown in FIG. 7 by links 16 to the mounting plate 11 and to the insulators 13, or as is shown in FIG. 8 to the links 19 and by links 53 to the conductor 12.

In the form of damper shown in FIG. 18, a plurality of conical dished spring washers 55 are provided, which may be of the type known as Belleville spring washers. The spring washers 55 are disposed in alternately facing and opposed pairs. A mounting rod 56 is provided in a telescoped relation to a mounting tube 57. The rod 56 and tube 57 have abutments 58 with extensions 59 therefrom having ends 46 received on pins 48 as before. While the washers 55 are shown as opposed pairs, they may also as shown in FIG. 24 have stacked pairs of washers 55 in opposed relation, or as shown in FIG. 25 have single opposed pairs with interposed flat washers 54.

It has heretofore been stated as to Belleville spring washers that practically all the energy absorbed during compression is returned but we have ascertained that to the contrary there is a marked hysteresis effect with energy absorption and dissipation when used in laminar array as shown in FIG. 24, which is helpful in providing desirable resistance to the applied forces. During cyclic compression of the Belleville spring washers arranged in stacked pairs in opposed relation as illustrated in FIG. 24, increments of energy will be absorbed and dissipated through hysteresis effect during each cycle. This extraction of energy during each cycle will counteract the effect of the increments of energy contributed by cross winds which, under resonant build-up conditions, cause galloping of the conductors.

Considerable difficulty has been encountered in structures heretofore available when subjected to ice and sleet formation thereon which effectively blocked movement of the parts.

In accordance with the invention and as herein set forth structures are provided which are free from this shortcoming.

The assembly TD2 in FIG. 16 which includes the damper 125, the spring 45, the heads 43 and the pins 48 is enclosed in a body 60 of an elastomer which has a substantially spherical portion 61 with which the link bars engage and end spherical protrusions 62 which enclose the pins 48. The elastomer of which the body 60 is formed can be of rubber, natural or synthetic or of a suitable resin, having the desired characteristics of ozone resistance, weather resistance, temperature resistance within and beyond the normal range of atmospheric temperatures, and, in addition to enclosing and encapsulating the portions referred to, also has a resilient energy absorbing and dissipating action supplemental to that of the spring 45 in FIG. 16 and the spring washers 55 in FIGS. 18, 24 and 25. One particularly suitable material is "Nordel," a hydrocarbon rubber made by E. I. du Pont de Nemours & Co., Beaumont, Tex., which also may be compounded to provide high hysteresis.

The pins 51, contiguous ends of the link bars 50, and contiguous ends of the links 52 are also enclosed within substantially spherical bodies 63 of the same or of a similar elastomer to that employed for the body 60.

Referring now to FIGS. 20 and 21 a plurality of spring washers 55 are mounted on rods 65 having end abutment heads 66. Enclosing housings 67 are provided having inturned end walls 68 through which the rods 65 extend and which provide in their interior abutments opposite the heads 66 for end washers 55 of groups separated by the end walls 68. The outermost housings 67 have end rods 69 extending therefrom with anchor rings or eyes 70 for attachment to the end mounting plate 11 and to the insulator 13. Washers 55 as shown in FIG. 24 and washers 54 and 55 as shown in FIG. 25 could also be employed, if desired.

A modified form is shown in FIGS. 22 and 23 in which, in place of the housings 67, other housings such as cages 72 are employed with parallel frame bars 73 extending to interior end collars 74, corresponding to the end walls 68, and through which the rods 65 extend.

The endmost cages 72 have end rods 75 extending therefrom with anchor rings or eyes 71 for attachment to the end mounting plate 11 and to the insulator 13.

In the form of dampers shown in FIGS. 10, 11 and 20 to 23, an outer enclosing envelop 76 of an elastomer is provided. It is to be understood that in the tension devices of FIGS. 20 to 23, a single end housing 67 or end cage 72 may be used instead of the plurality illustrated, in which case the end of the rod 65 which extends through the end wall 68 or the end collar 74 would have an eye 70 or 71 in place of the head 66.

In FIGS. 10 and 11 the elastomer envelop 76 is shown as bonded to the force applying rods 90 and 98 and to the cylinder 91.

In FIG. 20 the elastomer envelop 76 is preferably bonded to the exteriors of the end housings 67, and to the rods 69, but may be in slidable relation to the housings 67 intermediate the end housings 67, while, as shown in FIGS. 22 and 23, the elastomer envelop has interior portions 77 disposed within the cages 72 and bonded to the exteriors of the spring washers 55 and to the exposed portions of the heads 66 of the rods 65, but may be in slidable relation to portions of the frame bars 73.

In the manufacture of the tension and compression dampers heretofore described the same may be prestressed respectively in accord with normal line tensions before and during the application of the elastomer bodies 60 and 63 or envelop 76. By this, a damping action will be available upon both increase and decrease with respect to the normal line tension.

In use, the resilient and energy absorbing and dissipating characteristics of the dampers TD1, TD2, and CD1 will act to prevent the building up of the galloping action and attenuate any such action which does tend to occur. The elastomeric bodies and envelops prevent the accumulation of ice or sleet at locations which would interfere with the desired movement, thereby discouraging the occurrence of galloping, while at the same time these bodies and envelops protect the metallic parts from corrosion normally attendant upon exposure.

The elastomeric bodies and envelops also act as part of the resilient system of the damper at different force levels from those to which the metallic resilient members respond, by reason of their change of shape upon change of length of the mechanical elements around which they are mounted.

A further resilient action is obtained in the form of dampers shown in FIGS. 7, 8, and 16 to 19, by the physical engagement of the link bars 50 with the exteriors of the bodies 60.

We claim:

1. A wave damper for suppressing galloping oscillations in an overhead transmission conductor comprising a device having end connectors for disposition in connected relation to a conductor, said device having energy absorbing and dissipating means comprising a resilient member with an externally disposed elastomeric sheath having capacity for producing hysteresis effects, said device being so related to said conductor that oscillations thereof produce stresses in said resilient member and said elastomeric sheath, whereby hysteresis effects in said elastomeric sheath dissipate an increment of energy during each cycle of oscillation.

2. A wave damper as defined in claim 1 in which said resilient member includes a plurality of dished metallic portions in facing pairs.

3. A wave damper as defined in claim 1 arranged for tensile association with said conductor in which an operating linkage is provided and said means is disposed in compression in said linkage.

4. A wave damper as defined in claim 1 in which said means includes dished metallic portions, rods on which said metallic portions are mounted, and a plurality of elongated exterior members are provided in which said metallic portions are disposed in groups.

5. A wave damper as defined in claim 1 in which said resilient member includes a plurality of dished spring washers in stacked pluralities in opposed relation and increments of energy are also dissipated by hysteresis effects therein during each cycle.

6. A wave damper as defined in claim 1 in which said resilient member includes a plurality of dished metallic members some of which are disposed in facing relation and others in opposed relation, and said elastomeric sheath extends at least partially into the annular crevice between the opposed dished members.

7. A wave damper for suppressing galloping oscillations in an overhead transmission line comprising a plurality of dished metallic members, aligned rods having heads, said metallic members being supported on said rods and separator members within which said rods are disposed having end abutment portions interposed between said rod heads, the separator members at each terminus having end connections for force application thereto, whereby upon application of cyclic tensile forces to said end connections increments of energy will be dissipated by hysteresis effects in said dished metallic members during each cycle.

8. A wave damper as defined in claim 7 in which an elastomeric sheath is provided in enclosing relation to said separator members.

9. A wave damper for suppressing galloping oscillations in an overhead transmission line comprising force applying end members, an elongated housing to which one of said end members is connected, said housing having an apertured end portion opposite its connection to said end member, a plurality of resilient dished metallic members in said housing, said dished members being mounted in stacked pluralities in opposed relation on a rod having a head within said housing and a portion extending through the aperture in said end portion and being connected to the other end member, said dished members being compressible between said head and said end portion upon application of tensile force to said end members, whereby upon application of cyclic tensile forces to said end members increments of energy will be dissipated by hysteresis effects in said dished metallic members during each cycle.

10. A wave damper as defined in claim 9 including an encapsulation of elastomeric material providing corrosion protection and corona shielding.

11. A wave damper for suppressing oscillations in an overhead transmission line comprising, a plurality of dished spring washers assembled in stacked pluralities in opposed relation, means for maintaining said assembled spring washers in axial alignment, an operating linkage, said assembled washers being compressible by said operating linkage upon application of tensile force on said operating linkage, whereby upon application of cyclic tensile forces on said linkage increments of energy will be dissipated by hysteresis effect in said dished washers during each cycle.

References Cited

UNITED STATES PATENTS

| 1,884,981 | 10/1932 | Otto | 267—70 |
| 2,595,642 | 5/1952 | Daland | 267—70 |
| 3,151,857 | 10/1964 | Falkenberg | 267—71 |
| 3,292,917 | 12/1966 | Sherburne | 267—1 |

FOREIGN PATENTS

| 182,538 | 4/1907 | Germany. |
| 339,933 | 4/1936 | Italy. |

ARTHUR L. LA POINT, *Primary Examiner.*

R. M. WOHLFARTH, *Assistant Examiner.*